United States Patent [19]

Kumanomido

[11] Patent Number: 4,804,989
[45] Date of Patent: Feb. 14, 1989

[54] THIN, LARGE FORMAT FILM HOLDER AND ADAPTER THEREFOR

[76] Inventor: Shin-ichi Kumanomido, 7360 Pershing Ave., University City (St. Louis), Mo. 63130

[21] Appl. No.: 119,802

[22] Filed: Nov. 12, 1987

[51] Int. Cl.$^4$ ............................................. G03B 17/26
[52] U.S. Cl. .................................... 354/283; 354/276
[58] Field of Search ............... 354/276, 277, 283, 284, 354/285; 355/73

[56] References Cited

U.S. PATENT DOCUMENTS

| | | | |
|---|---|---|---|
| 370,370 | 9/1887 | Blair | 354/285 |
| 874,644 | 12/1907 | Torrani | 354/282 |
| 1,070,843 | 8/1913 | Price | 354/282 |
| 2,017,709 | 10/1935 | Billing | 354/283 |
| 2,082,257 | 6/1937 | Odell | 354/283 |
| 2,137,380 | 11/1938 | Billing et al. | 354/283 |
| 2,326,075 | 8/1943 | Smith et al. | 354/285 |
| 2,450,841 | 10/1948 | Moore | 354/285 |
| 2,497,270 | 2/1950 | Panosian | 354/277 |
| 2,552,905 | 5/1951 | Panosian | 354/284 |
| 3,747,496 | 7/1973 | Bahnsen | 354/282 |
| 4,456,358 | 6/1984 | Busch | 354/285 |

Primary Examiner—A. A. Mathews
Attorney, Agent, or Firm—Paul M. Denk

[57] ABSTRACT

A pliable film holder for large format photographic film includes a relatively pliable, flat film retainer for fixedly yet removably holding a sheet of large format film. The retainer has a window behind which the film is disposed. A relatively pliable, sheet-like slide member completely covers the window when disposed in a first position with respect to the film retainer and uncovers the window to expose the sheet of film to incident light when disposed in a second position. The film retainer and slide member have cooperating guides for guiding the slide member as it is moved with respect to the film retainer. In a second embodiment the pliable film holder includes a relatively pliable, flat film retainer which has a back and a front, the window being in the front. The slide member in this embodiment is a substantially opaque envelope to prevent light coming from the direction of front and back of the envelope to expose the film within when the envelope is in the first position, which is when the opening of the envelope is moved into the double flaps of the film retainer. The film retainer is for use in conjunction with a film adapter.

23 Claims, 5 Drawing Sheets

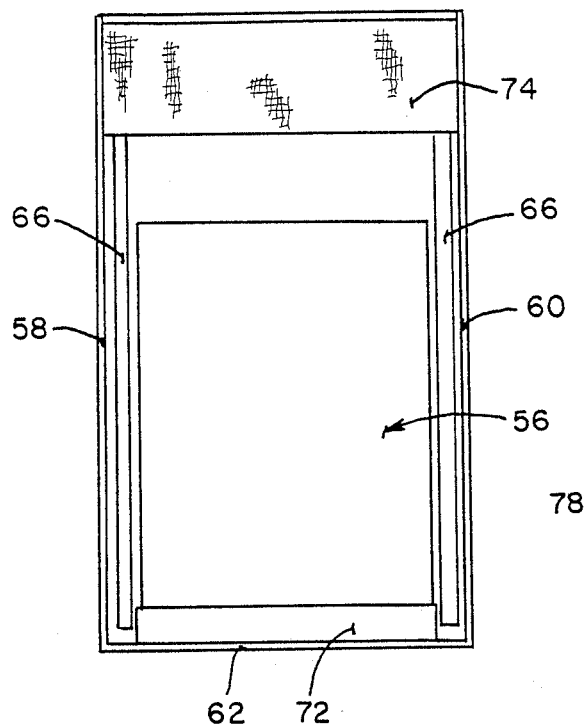
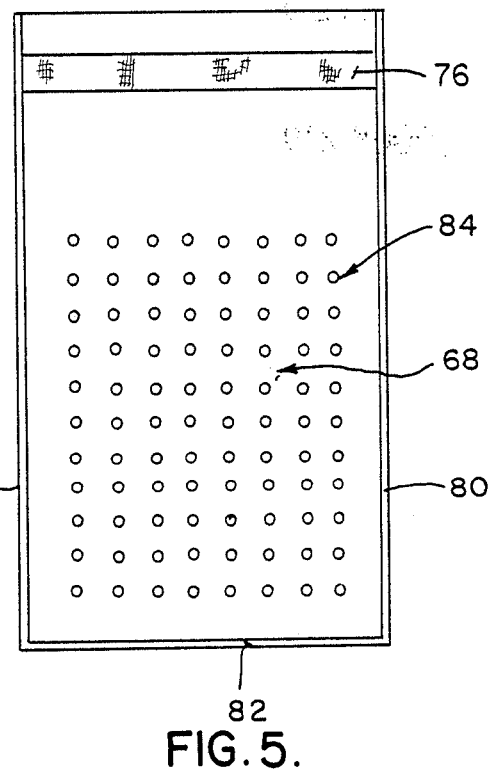
FIG. 4.    FIG. 5.
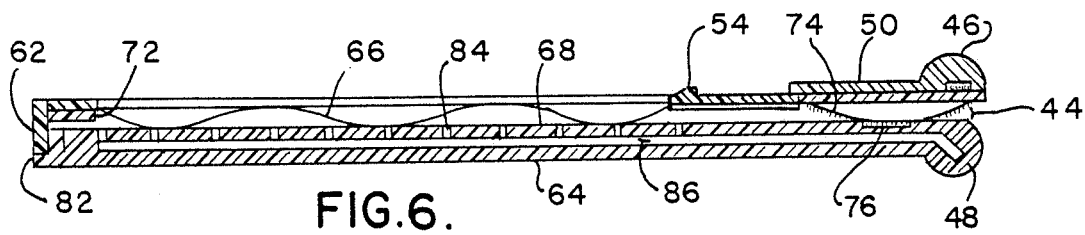
FIG. 6.
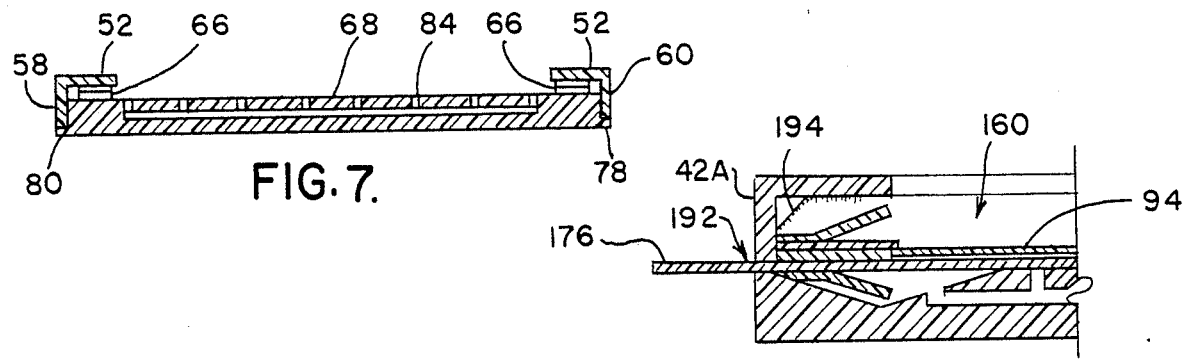
FIG. 7.    FIG. 22.

THIN, LARGE FORMAT FILM HOLDER AND ADAPTER THEREFOR

Cross Reference to Related Application

A disclosure document was filed in the U.S. Pat. and Trademark Office upon this development on March 31, 1986, and assigned Disclosure Document No. 148236.

BACKGROUND OF THE INVENTION

This invention relates generally to photography and more particularly to film holding apparatus for large format sheet film.

It is well known that large format photography has several advantages, most of which flow from the high quality of the resulting photographs taken in this format. This high photographic quality comes at a high price, however. That price includes not only the weight and size of the large format field camera or view camera itself, but also the great weight and bulk of the large quantity of large format sheet film the photographer must carry.

For large format sheet film to be readily useful, every single sheet of film must be loaded into a film holder. Examples of such film holders are shown in the following U.S. patents:

U.S. Pat. No. 370,370 to Blair is directed to a camera plate holder for holding photographic film. That particular holder had a rigid frame, a central plate "c" (FIG. 4) with photographic film on both sides of the plate, a pair of slides "b" and "b'" and a pair of flexible cloth or rubber flaps "g" which are used to prevent the entry of light into the space between the dark slides b and b' and the photographic plate c itself.

U.S. Pat. No. 2,017,709 to Billing is directed to a carrier for photographic film, which carrier is made entirely of paper with inter-engaging stops operative between an inner envelope and outer envelope to prevent complete separation of the two envelope elements as a dark slide is removed to reveal the film. It states in column 1 of the Billing patent that the carrier and all its various parts are constructed of material which can easily be folded to a desired shape without cracking or breaking. As noted on page 2, lines 68 through 73, that particular carrier is specifically designed for a camera having a hinged back which serves to grip the carrier between the back of a camera and the opposed edge of the side wall of the camera.

U.S. Pat. No. 2,082,257 to Odell relates to a film holder which is made of paper or other lightweight material and which carries a piece of film in a light-tight manner. According to page 1, column 1, lines 11 through 19, the film holder in Odell enables a photographer to carry a large number of films of different character or sensitivity without the necessity of employing a bulky or heavy film holder. The film holder in Odell includes means for breaking the seal of the film holder to allow the film to be exposed once in the camera, but Odell is apparently silent on any way to reform the light seal around the film once the photograph has been taken.

U.S. Pat. No. 2,137,380 to Billing et al is directed to a film envelope similar to that shown in U.S. Pat. No. 2,017,709 described above.

U.S. Pat. No. 2,326,075 to Smith et al describes a film holder for photographic cameras having a relatively rigid, molded plastic frame. The main purpose of Smith et al is to maintain the distance between the back of the film and the camera as constant as possible to maintain the accuracy of the depth of focus.

U.S. Pat. No. 2,450,841 to Moore relates to a film holder for photographic cameras that can be economically manufactured. It has a rigid dye-cast frame capable of holding two sheets of film.

U.S. Pat. No. 2,497,270 to Panosian relates to a light seal for a photographic film holder. This patent points out that the increasing light sensitivity of photographic film had by 1948 made it increasingly difficult to manufacture a film holder such as those described above which were light-tight under all operating conditions (column 1, lines 39–43). The particular invention in Panosian is related a new construction which allegedly provided more space for the light seal than in previous film holders (column 2, lines 25–46).

U.S. Pat. No. 2,552,905 to Panosian is directed to film identifying means for photographic camera film holders and is a division of U.S. Pat. No. 2,497,270 described above.

U.S. Pat. No. 4,456,358 to Busch describes a film holder for field and studio cameras having automatic film loading elements to facilitate insertion and the positioning of the film within the apparatus.

The burden of carrying prior art film holders becomes progressively worse as the photographer's need for film increases. For example, a typical prior art film holder for a camera which uses 4" by 5" sheet film measures approximately 5" by 7" by ½". Such a holder weighs about 6.5 ounces and holds two sheets of 0.008" thick film. If the photographer wants to carry one hundred sheets of film, for example, fifty film holders would be needed. Fifty film holders of this size and weight would total 5" by 7" by two feet, and would weigh over twenty (20) pounds. That much bulk and weight is far beyond the amount a photographer would normally care to carry around, especially during work in the field or on location. On the other hand, the photographer despite this weight and bulk might on many occasions need and want more sheet film than can be easily carried. The burden of carrying a large number of prior art film holders is thus painfully evident.

At least one film/film holder combination is available which avoids some of these problems of weight and bulk. The film and the film holder are sold by Polaroid Corporation as various types of instant films under trade designation of Polaroid instant film and the recently introduced non-instant, conventionally processing Polaroid Chrome Film, all to be used with the Polaroid Film Holder Model 545. These film are individually factory packaged in a light tight envelope sealed on three sides and having an opening on the fourth side which is closed by metal double flaps, which also hold the sheet of film within the envelope without any other means of support. This film in the envelope is used with the 545 film holder, which has a slot therein for insertion of the envelope. First, this envelope is inserted into the 545 film holder and the film holder is in turn secured to the camera for the exposure of the film. Before the photograph is taken the envelope is withdrawn to uncover the film in the film holder. This motion does not move the film because the metal flap is at the time retained by a latch in the film holder. After photograph is taken with the prior art Polaroid system, the envelope is moved back to cover the exposed film and into the metal double flaps. The latch is manually released and the entire envelope with film within is removed from the film holder. In the case of the instant film the envelope is peeled open in halves to reveal the finished photographic print and the destroyed envelope and the metal flap are disposed of. In the case of the Polaroid Chrome Film, the envelope is later withdrawn in a darkroom to remove the film within for processing in conventional manner and the envelope and the metal flap are disposed of.

The envelope of the Polaroid Film is not reusable. That is, the photographer is not able to reload the Polaroid film envelope with relatively inexpensive bulk sheet film offered by other manufacturers. Also the prior art sheet film holder by virtue of its design traps dust easily. It is relatively difficult and time consuming to remove the dust once it gets inside, thereby making the task of cleaning the film holder most dreary, but absolutely necessary in order to avoid the further aggravation later on.

SUMMARY OF THE INVENTION

Among the various objects and features of the present invention may be noted the provision of a film holding system which substantially reduces the excessive bulk and weight of prior film holders.

Another object of the present invention is the provision of such a system which facilitates easier cleaning of the film holder than that of the prior art film holders for reuse.

A third object of the present inventions is the provision of such a system which provides improved support for the film in the camera.

Other objects and features will be in part apparent and in part pointed out hereinafter.

In order to achieve the above objectives, a film holder of substantially reduced thickness is provided along with a special device, a film holder adapter, to maintain a sheet of film within the film holder to the exact focal plane of the camera just as the thickness of the prior art film holder is dimensioned to meet that specification.

Briefly, a film holder adapter of the present invention for a large format camera includes a housing defining an interior open space for a sheet of large format photographic film. The housing is suitably dimensioned to be insertable into a corresponding present art film holder slot of a large format camera and has a first, generally rectangular opening from the exterior thereof to the interior open space to allow light to pass through the housing to expose the sheet of film when the camera is operated. The housing also has a second, generally slit-like opening from the exterior to the interior open space of the housing to allow a thin film holder of present invention to be inserted from the exterior of the housing into the interior open space and removed therefrom. A light shield is disposed adjacent to the second slit-like opening for preventing light from passing from the exterior of the housing through the second slit-like opening to the sheet of film when a camera is operated. A backing plate in the housing defines a back to the open space for the sheet of film. Structure is also included for applying a vacuum from an external source to the back of the film holder of the present invention to flatten it against the plate, so that the maximum flatness of a sheet of film within the film holder can be maintained.

A pliable film holder of the present invention for large format photographic film includes a thin relatively pliable, flat film retainer for removably holding a sheet of large format film. The retainer has a back and a front, the front having an opening therein dimensioned to accept the sheet of large format film and to allow light to pass through the opening to expose the sheet of film when the film holder is used in a camera. The sheet of film is held fixed in place by the film retainer. The back of the film retainer is opaque to prevent light coming from the direction of the back of the film retainer from exposing the film. The film holder also includes a thin relatively pliable, sheet-like slide member suitably dimensioned to completely cover the opening in the film retainer when disposed in a first position with respect to the film retainer and for uncovering at least part of the opening to expose the sheet of film to incident light when disposed in a second position with respect to the film retainer. The film retainer and slide member have cooperating guides for guiding the slide member as it is moved longitudinally with respect to the film retainer.

In a second embodiment of the present invention, a thin pliable film holder for large format photographic film includes a relatively pliable, flat film retainer for removably holding a sheet of large format film. The retainer has a back and a front, the front has an opening therein dimensioned to accept the sheet of large format film and to allow light to pass through the opening to expose the sheet of film when the film holder is used in a camera. The sheet of film is held fixed in place by the film retainer. The film holder also includes a relatively pliable substantially opaque slide for completely covering the opening in the film retainer when disposed in a first position with respect to the film retainer to prevent light coming from the direction of the front and back of the slide to expose the film within and for uncovering at least part of the opening to expose the sheet of film to incident light when disposed in a second position with respect to the film retainer. The slide forms an envelope in which the film retainer is slidably disposed.

The objects of the present invention are achieved in a single-sheet loading, thin, reusable film holder less than 1/16" in thickness and about one ounce in weight, using 10/1000 inch material. However, it is further possible to reduce the thickness of the film holder down to 1/32 inch using 5/1000 inch material available only by special order. These film holders are used with a film holder adapter about ½" in thickness. With this system, one hundred 4" by 5" film holders are less than six inches deep and weigh only seven pounds, including the adapter. With this system photographers can carry three to four times more sheet film than with prior film holders in a given space or weight.

Also due to the extreme thinness of the film holder it can be cleaned by the prior art film cleaner in seconds in the same manner as film.

BRIEF DESCRIPTION OF THE DRAWINGS

FIG. 4 is an interior plan of the upper half of the film holder adapter of FIG. 3;

FIG. 5 is an interior plan of the lower half of the film holder adapter of FIG. 3;

FIG. 6 is a longitudinal sectional view of the film holder adapter of FIG. 3;

FIG. 7 is a transverse section of the film holder adapter of FIG. 3;

FIG. 22 is a partial sectional view of the film holder of FIG. 18 in a modified film holder adapter.

Similar reference characters indicate similar part throughout the several views of the drawings.

DESCRIPTION OF THE PREFERRED EMBODIMENTS

Figure 1:
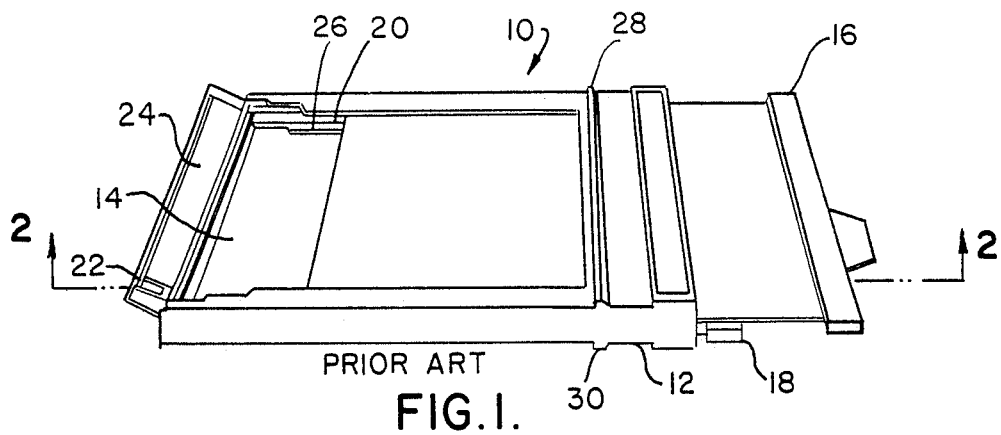
FIG. 1 is a perspective view of a prior art film holder.
Figure 2:
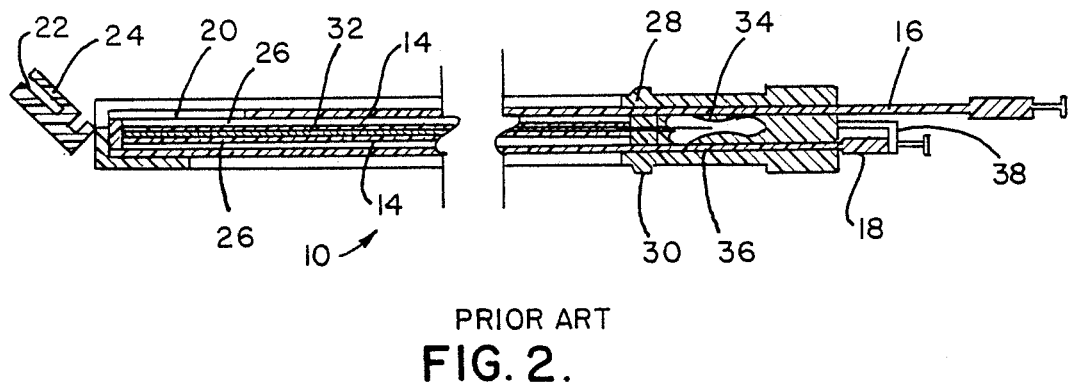
FIG. 2 is a cross-sectional view taken along line 2—2 of FIG. 1.

A typical prior art film holder 10 (FIG. 1) includes a rigid housing 12 having provision for accepting two sheets 14 of large format photographic film, such as a 4×5 inch sheet of film. For clarity, in FIG. 1 only the top sheet of film 14 is shown, along with the corresponding structure of film holder 10. Both sheets are shown in FIG. 2.

Film holder 10 includes a pair of dark slides 16 and 18 which function when completely inserted in a set of grooves 20 and 22 in the film holder to completely cover the sheet of film 14 to provide a light tight enclosure for the film. To facilitate insertion of a piece of film in film holder 10, the holder is provided with a bottom flap 24 which may be opened to the position shown in FIG. 1 to allow the sheet of film 14 to be inserted into the film holder. When the bottom flap is moved to its closed position, dark slide 16 is moveable to the left from the position shown in FIG. 1 along groove 20 until it seats in slot 2 disposed in bottom flap 24.

Holder 10 includes a film retaining ridge 26 disposed below groove 20 to retain film 14 in place once it has been manually inserted into the film holder. Film holder 10 itself includes a pair of light lock keys 28 and 30 which cooperate with the camera (not shown) to prevent extraneous light from entering and exposing film 14 when the film holder is used in a camera and slide 16 is withdrawn.

Film holder 10 includes a common film resting plate 32 (FIG. 2) upon which sheets of film 14 rest while in the holder. Holder 10 also includes a pair of light lock gates 34 and 36 adjacent to their respective dark slides 16 and 18 to prevent light from entering the interior of holder 10 along the slides. A dark slide lock 38 is also provided to keep the dark slide which is not being used locked in its closed position.

It should be noted that film holder 10 is rigid as are dark slides 16 and 18 and that film holder 10 is of a substantial thickness such as approximately ½ inch. Such a film holder suffers from the disadvantages set forth above in the background of the invention.

A film holder 40 (FIG. 3) of the present invention is used in conjunction with a rigid film holder adapter 42. The film holder adapter is of generally the same overall shape as the prior art film holder of FIG. 1. Adapter 42 includes a slot 44 permitting the manual insertion and removal of film holder 40 into and out of the film holder adapter. Adjacent to slot 44 are upper and lower grips 46 and 48 to facilitate the insertion and removal of adapter 42 itself into and out of a large format photographic camera. Adjacent to upper grip 46 is a light lock gate compartment 50.

A relatively flat front surface 52 of adapter 42 is disposed on the side of light lock gate compartment 50 opposite the hand grips. This relatively flat surface is interrupted by a light lock key 54 and by an image framing window 56 of generally rectangular shape. Film holder adapter 42 also includes a pair of longitudinal sides 58 and 60 (FIG. 4), an end wall 62, and a closed bottom 64 (FIG. 6). The film holder adapter is constructed so that light may enter the interior of the film holder adapter only through image framing window 56.

Figure 3:
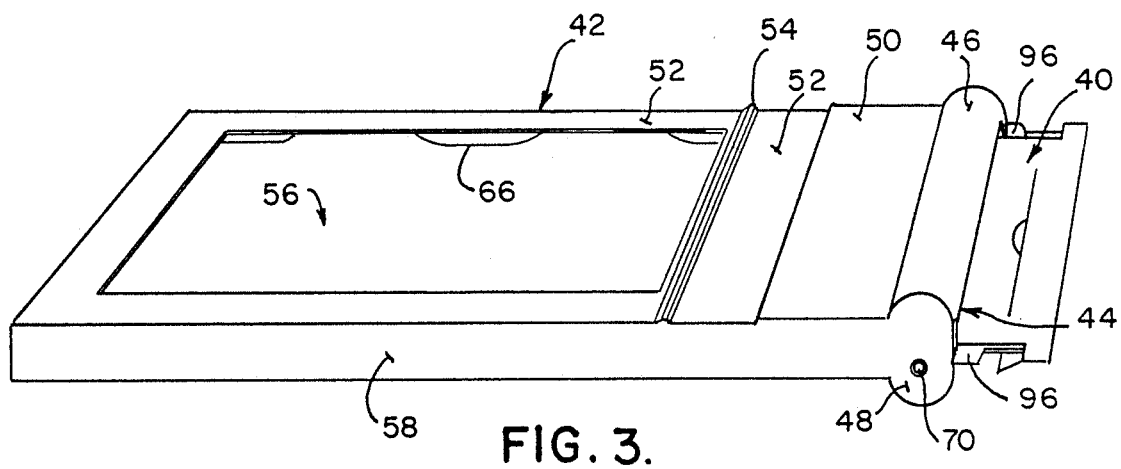
FIG. 3 is a perspective view of a film holder adapter of the present invention with a film holder of the present invention inserted therein.

A pair of leaf springs 66 are disposed longitudinally along each side of image framing window 56. These leaf springs are selected to be of such length that they press film holder 40 flat against its resting plate 68 (FIG. 5) during use. As shown in FIG. 3, film holder adapter 42 also includes a vacuum socket 70 to which a piece of flexible tubing (not shown) from a small hand operated or battery operated vacuum pump may be attached.

A spring guide 72 (FIG. 4) is disposed at one end of image framing window 56 to hold leaf springs 66 against lateral movement. These leaf springs are also suitably secured against movement at their other end. At the end of the leaf springs adjacent to the handgrips, there is disposed a light lock gate 74, which as shown in FIG. 6 has a generally bowed shape so that its center portion rests against a piece of fabric 76 embedded in the lower portion of the film holder adapter. Light lock gate 74 is also formed of any suitable material and shape such as rubber roller as is known in the art.

Sides 58 and 60 and end 62 of adapter 42 depend downwardly from the top of the adapter to overlap film holder resting plate 68. Film holder resting plate 68 is elevated above the remaining portion of the bottom of the film holder adapter so that sides 58 and 60 and end 62 extend downwardly past film holder resting plate 68 to rest on a set of ledges 78, 80, and 82 (FIG. 5).

Film holder resting plate 68 has a plurality of openings 84 formed therein arranged in a generally rectangular array of about the same size as the film which is held by film holder 40. These openings 84 are connected to a common cavity 86 (FIG. 6) disposed in the base of film holder adapter 42. Cavity 86 is connected to vacuum socket 70 so that upon application of a vacuum to socket 70 that vacuum is applied to the set of openings 84 to draw film holder 40 down flat against film holder resting plate 68. This insures maximum flatness of film holder 40 and the sheet of film therein.

Film holder 40 is illustrated in detail in FIGS. 8 through 17. Film holder 40 consists of two parts, a film retainer 86 and a dark slide 88 which is slidingly diposed with respect to the film retainer to open and close a window 90 in the film retainer to reveal and cover the film contained therein as needed.

Figure 9:
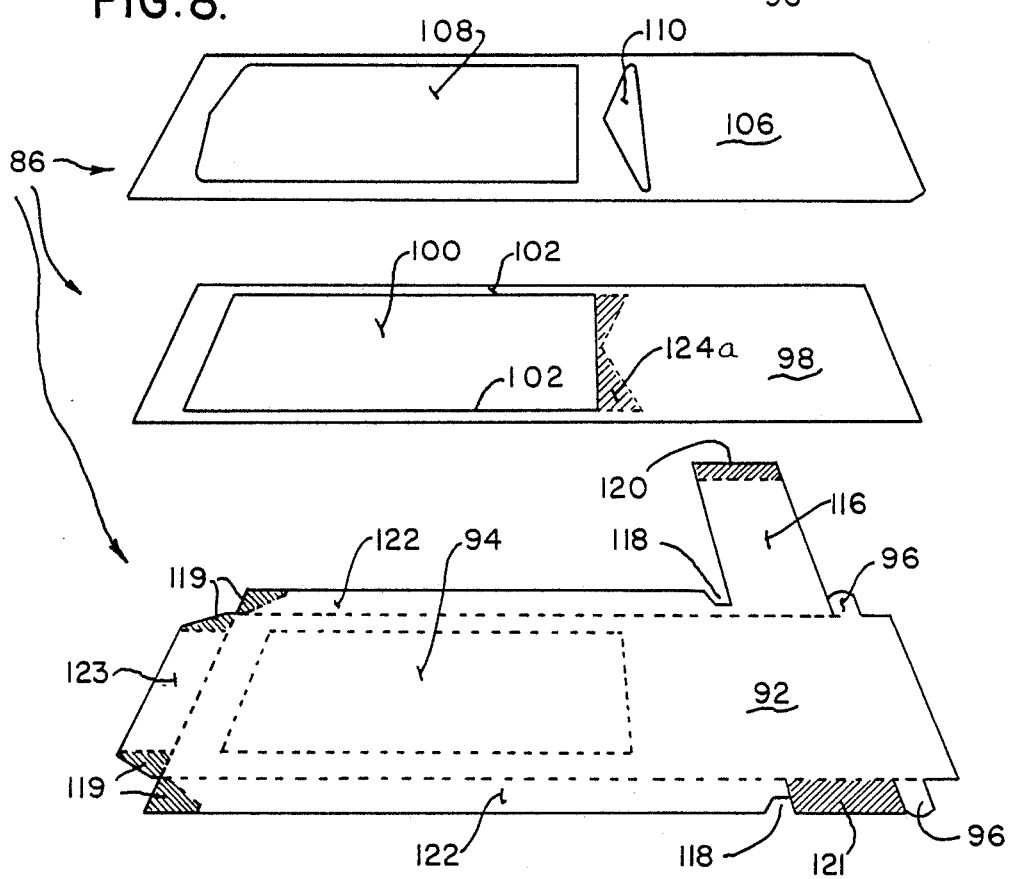
FIG. 9 is an exploded view of the film retainer portion of the film holder of FIG. 8.
Figure 10:
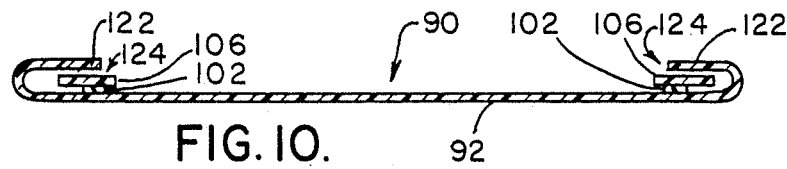
FIG. 10 is a transverse section of the film retainer of FIG. 9.
Figure 11:
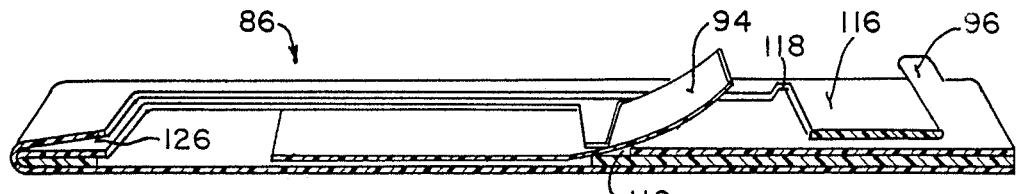
FIG. 11 is a longitudinal section in perspective of the film retainer of FIG. 9.
Figure 12:
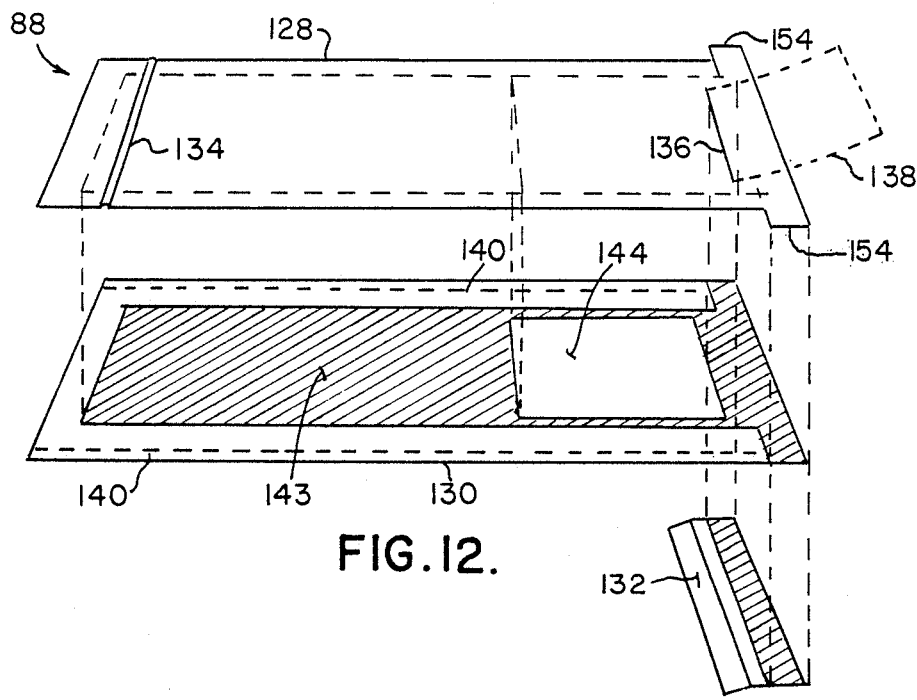
FIG. 12 is an exploded view of the slide member of the film holder of FIG. 8.

The film retainer portion of film holder 40 is shown in detail in FIGS. 9 through 11. Film retainer 86 (FIG. 9) consists of three layers of thin, pliable, opaque material, although given the present disclosure film retainers having more than three layers could also be used in the present invention.

The topmost layer, labeled 106, has a window 108 which is slightly smaller than a window 100 of a middle layer 98. It also has formed therein a narrow triangular slot 110 to facilitate insertion and removal of sheet film 94 into and from window 100 of the middle layer 98.

The middle layer 98 defines window 100 for the film, which window is substantially the same size as the sheet film itself. Window 100 is framed on each side of layer 98 by a narrow longitudinal window frame 102.

The bottom layer, labeled 92, is a solid sheet on which a sheet of large format film 94 (shown in dotted lines) rests. Layer 92 has a pair of longitudinally extending flaps 122 and a bottom flap 123 on the left. Each longitudinal flap has a notch 118, but only one of the flaps has a long and wide belt 116. Layer 92 also has a pair of ears 96 which extend transversely outwardly from the body of the layer 92.

Figure 8:
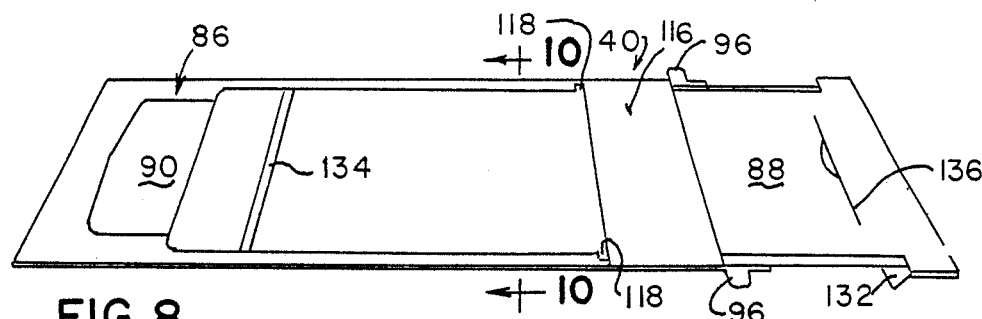
FIG. 8 is a perspective view of a first embodiment of a film holder for use with the film holder adapter of FIG. 3.

To assemble the layers of the film retainer 86; first, the top, middle and bottom layers are laminated together, except the shaded area labeled 124a on layer 98; second, flaps 122 and 123 including the belt 116, but excluding the ears 96 are folded around the composite structure as shown in FIG. 10, and sealed at the overlapping shaded areas 119, 120 and 121 to form a unified film retainer as shown in FIGS. 8, 10, and 11. The reason the second and third layers are not laminated together at 124a is to facilitate passage of sheet film 94 between those two layers when the film is being loaded or unloaded.

The relative widths of the three layers of the film retainer are illustrated in FIG. 10. The bottom layer is significantly wider than the other layers so that flaps 122 may be folded around the other two layers as shown to form a single unitary structure, and also forms the base for the film retainer and the backing plate for the sheet of film 94 itself. The middle layer 98 has a window 100 which is somewhat larger than window 108 of layer 106, but the overall width of layer 98 is less than that of layer 106 so that the sides 102 of layer 98 define the sides of the cavity into which the sheet of film 94 is inserted. Layer 106 overhangs this cavity somewhat, as shown in FIG. 10, to retain the sheet of film in the cavity thus formed by bottom layer 92, middle layer 98, and top layer 106. These layers form a pair of channels in which the film travels as it is inserted into the cavity and removed therefrom as desired. It should be noted that the flaps of the bottom layer 92 are not secured to layer 106 so that there exist an additional set of channels 124 between the top layer 106 and the folded flap of the bottom layer. As will become apparent, this set of channels 124 provides a track upon which dark slide 88 may be moved inwardly and outwardly.

There also exists a V-shaped channel 126 at the leftmost portion of film retainer 86 (as shown in FIG. 11) between top layer 106 and the folded bottom flap of layer 92. As will become apparent, this channel is a continuation of channels 124 and accepts the end of dark slide 88 when the slide is fully inserted into film retainer 86. As also shown in FIG. 11, the sheet of film 94 may be inserted through triangular slot 110 in layer 106 to secure the film in the cavity formed by the three layers and may be similarly removed therefrom.

Dark slide 88 of film holder 40 includes an upper layer 128 (FIG. 12), a lower layer 130, and a lower flap 132. Upper layer 128 includes a bumper strip 134 extending transversely across the dark slide. This bumper strip extends upwardly from the top surface of upper layer 128 so that it is engaged by belt 116 of film retainer 86 when the dark slide is moved outwardly to uncover the sheet of film 94. This engagement prevents inadvertent removal of dark slide 88 completely from film holder 40.

Upper layer 128 also includes a slit 136 disposed at the end opposite bumper strip 134 to facilitate the insertion of a piece of paper 138 into a pocket formed between layers 128 and 130. This piece of paper can be used for film exposure record keeping.

Figure 13:
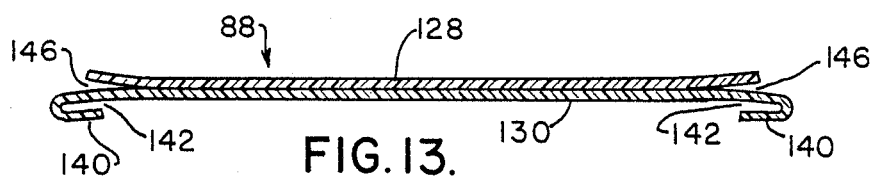
FIG. 13 is a tranverse section of the slide member of FIG. 12.

Lower layer 130 includes a pair of longitudinally extending flaps 140 which are folded over as shown in FIG. 13 to provide a pair of U-shaped channels 142. Upper and lower layers 128 and 130 are laminated together by welding or a suitable adhesive at the shaded area labeled 143 in FIG. 12, leaving the area labeled 144 unlaminated to form the pocket to which slit 136 provides the entrance. In addition, flap 132 is laminated to lower layer 130 at the cross-hatched area to secure the flap to the lower layer. The fact that the area of lamination does not extend the entire width of upper layer 128 results in a pair of V-shaped channels 146 (FIG. 13) being formed along the longitudinal edges of the dark slide.

Figure 14:
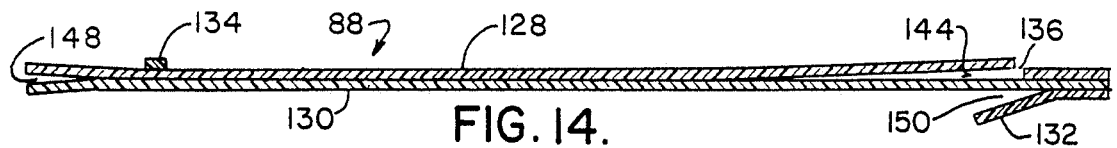
FIG. 14 is a longitudinal section of the slide member of FIG. 12.

Upper and lower layers 128 and 130 of the dark slide are not laminated at the left end (see FIG. 14). This results in the formation of a deep V-shaped channel 148 at the end between those two layers adjacent to bumper 134. A similar channel 150 is formed at the other end of dark slide 88 by lower layer 130 and flap 132.

Figure 15:
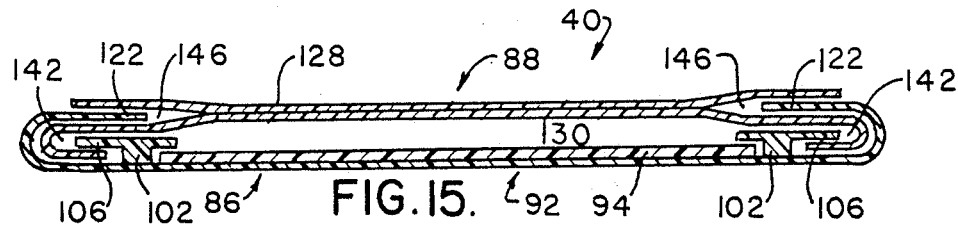
FIG. 15 is a transverse section of the film holder of FIG. 8.
Figure 16:
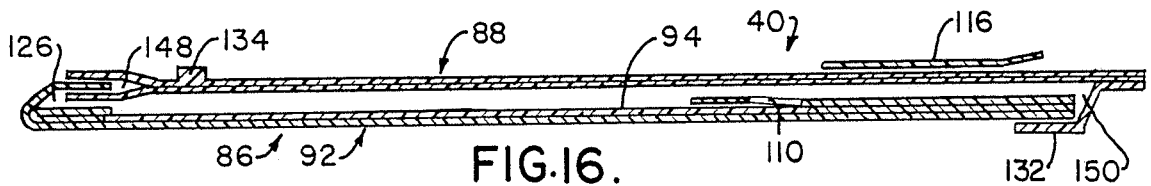
FIG. 16 is a longitudinal section of the film holder of FIG. 8.
Figure 17:
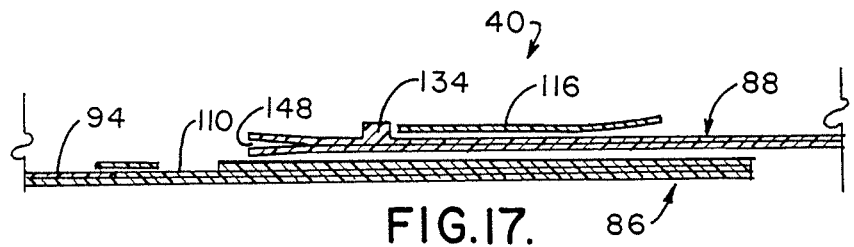
FIG. 17 is a partial longitudinal section of the film holder of FIG. 8 showing the slide member in its retracted position.
Figure 18:
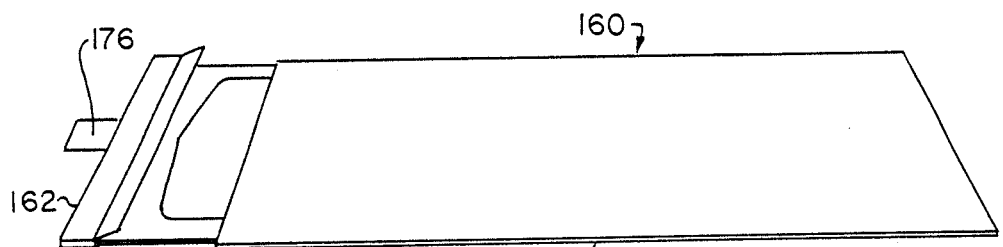
FIG. 18 is a perspective view of the second embodiment of the film holder of the present invention.

FIGS. 15 through 17 further illustrate the construction of film holder 40. When assembled, dark slide 88 and film retainer 86 interlock as shown in FIG. 15. More specifically, the folded flaps of the bottom layer 92 of film retainer 86 ride in V-shaped channels 146 of dark slide 88 while at the same time the outer lateral edges of layer 106 of the film retainer ride in U-shaped channels 142 of dark slide 88. This provides an extremely tortuous path for light to follow to enter the interior of the film holder where film 94 is disposed, which makes film holder 40 positively light tight.

Along one end of the film holder, the film retainer's deep transverse V-shaped channel 126 (FIG. 16) engages the corresponding dark slide's deep V-shaped channel 148 near bumper 134 to light seal that end of film holder 40. Similarly, the other end of film retainer 86 fits in channel 150 of dark slide 88 formed by flap 132 to seal the other end of the film holder against light.

Belt 116 (FIG. 16) of film retainer 86 is disposed at the same end of the film holder as flap 132. Normally belt 116 is not engaged by bumper 134. But (see FIG. 17), when dark slide 88 is withdrawn to uncover film 94, bumper 134 is engaged by belt 116 to prevent inadvertent total removal of dark slide 88 from film holder 40.

Film holder 40 is assembled and used as follows: Dark slide 88 is first inserted into the slot between belt 116 and top layer 106 of film retainer 86 and is pushed inwardly with respect to the film retainer. At this time the edges of top layer 106 should be inserted into U-shaped channels 142 of dark slide 88 so that the dark slide is guided by the longitudinal edges of the top layer. At this point, until the dark slide clears film retainer belt 116, only the top layer 106 of the film retainer is guiding the dark slide. As dark slide 88 emerges from underneath belt 116, the inside corners of the folded longitudinal flaps of the bottom layer 92 are pressed down at notches 118. This causes the longitudinal V-shaped channels 146 of dark slide 88 to catch the longitudinal folded flap of the bottom layer, thus completing the interlocking of film retainer 86 and slide 88 as the dark slide is pushed further into the film retainer (see FIG. 15).

To load film into film holder 40, dark slide 88 is withdrawn from film retainer 86 until bumper 134 of the dark slide strikes belt 116 of film retainer 86 to halt further withdrawal. Film holder 40 is then placed on a flat and level surface. A sheet 94 of photographic film is then held by a transverse edge and inserted through narrow triangular slot 110 into film retainer 86 (see FIG. 11). The film is pushed into film retainer 86 until it stops. At this point the film is lodged within window 100 of second layer 98. Then film holder 40 is closed by pushing dark slide 88 all the way into film retainer 86 until the top end of film retainer 86 is fully seated in channel 150 formed by flap 132 of dark slide 88.

To use film holder 40 in a photographic procedure, film holder 40 is inserted into film holder adapter 42 (FIG. 3) and the adapter is inserted into the back of a prefocused field camera or view camera. To uncover the film in film holder 40, the user then pinches one of a pair of ears 96 on film retainer 86 while pulling dark slide 88 outwardly from the adapter until the dark slide stops automatically as bumper 134 engages belt 116. Holding on to the ears of the film retainer prevents the film retainer from inadvertently being pulled out of adapter 42 along with dark slide 88. After film 94 is exposed, dark slide 88 is pushed all the way back into film retainer 86. At that point the entire film holder 40 is grasped firmly at flap 132 and the entire film holder 40 is pulled out of adapter 42. If the photographer wishes to expose multiple sheets of film, the adapter is left inside the camera and the above procedure is repeated as many times as needed.

To unload film from film holder 40, it is only necessary to withdraw dark slide 88 from film retainer 86 until bumper 134 engages belt 116 of the film retainer. At that point the user reaches into triangular slot 110, grasps the edge of sheet film 94, and simply extracts the film through the slot.

Turning to FIGS. 18 through 22, there is shown a second embodiment of the film holder of the present invention. This film holder, labeled 160, is of two-part construction. The first part is a film retainer 162 and the second part is a dark envelope 164. The film retainer is shown partially withdrawn from dark envelope 164 in FIGS. 18 and 21.

Figure 19:
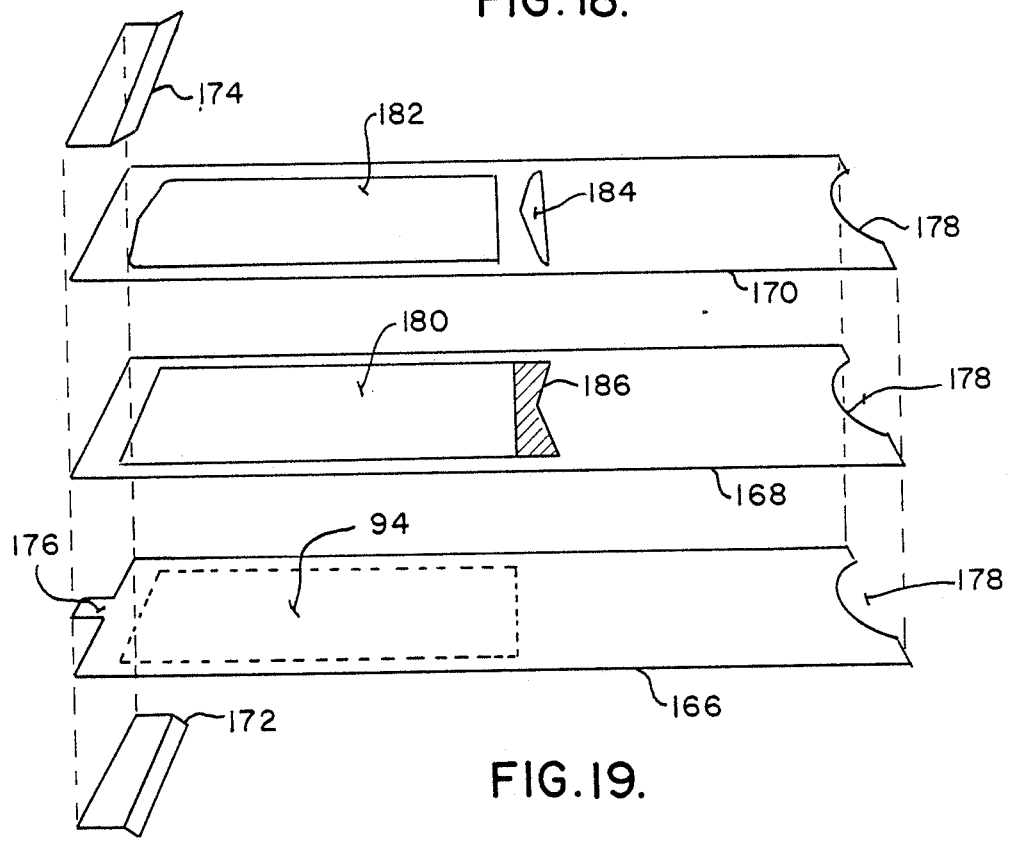
FIG. 19 is an exploded view of the film retainer portion of the film holder of FIG. 18.

Film retainer 162 consists of three layers 166, 168, and 170, and a pair of flaps on 172 and 174 (FIG. 19). Bottom layer 166 is a solid, pliable sheet upon which film sheet 94 rests. This layer includes a tongue 176 which extends outwardly past the rest of the body of film retainer 162 (see FIG. 18). At the opposite end of film retainer 176 in all three layers is a large semi-circular cut-out 178. This cut-out prevents film retainer 162 from being pulled along with dark envelope 164 when the dark envelope is withdrawn for an exposure of sheet film 94.

Second layer 168 has a sheet film sized window 180 of a size suitable for accepting and snugly holding sheet film 94. Upper layer 170 has a window 182 that is somewhat smaller than window 180 of middle layer 168. The upper layer also includes a narrow triangular slot 184 to facilitate insertion and removal of sheet film 94 into and from window 180 of middle layer 168. Layers 166, 168, and 170 are laminated together by means of welding or adhesive except for area 186 (shown cross-hatched in FIG. 19), where the middle layer is not laminated to the upper layer. Flaps 172 and 174 are laminated to the layers of the film retainer as well.

Figure 20:
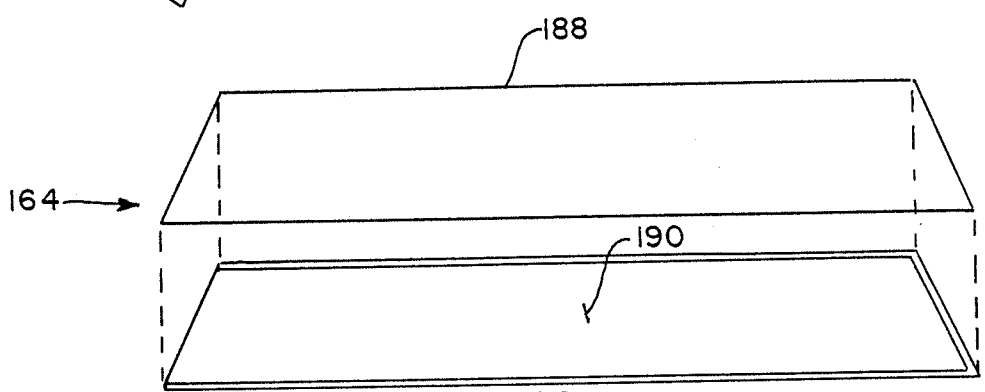
FIG. 20 is an exploded view of the envelope portion of the film holder of FIG. 18.

Dark envelope 164 (FIG. 20) is made up of an upper layer 188 and a lower layer 190 sealed together along three edges indicated by the shading in FIG. 20.

Figure 21:
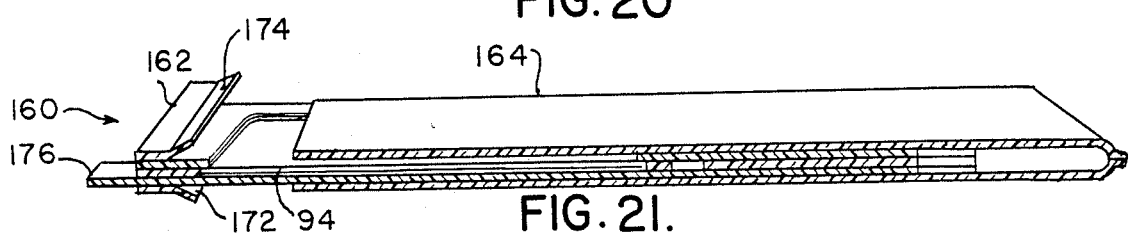
FIG. 21 is a perspective view similar to FIG. 18 with parts broken away to reveal interior detail.

When dark envelope 164 is pushed from the position shown in FIG. 21 to its fully closed position in which the open end of dark envelope 164 is pushed completely into the channels formed by flaps 172 and 174 of the film retainer, film holder 160 is light tight. The film is uncovered in a camera by withdrawing dark envelope 164 further than is shown in FIG. 21 to uncover windows 180 and 182 of the middle and upper layers of film retainer 162.

Film holder 160 may be used with adapter 42 (FIG. 3) once that adapter is slightly modified in order to allow tongue 176 to protrude out the end of the film holder adapter. A portion of such a modified film holder adapter, labeled 42A, is shown in FIG. 22. In this embodiment, tongue 176 of film holder 160 protrudes through a slot 192 in the end of film holder adapter 42A. The end of adapter 42A is provided with a fabric lined light lock gate 194 to prevent light leak through slot 192. The protrusion of film retainer tongue 176 through slot 192 in film holder adapter 42A allows the photographer to pinch the tongue and counterpull while dark envelope 164 is withdrawn for an exposure of sheet film 94. Of course such a modified film holder adapter 42A may also be used with film holder 40, the first embodiment of the film holder of the present invention.

Operating procedures for film holder 160 are generally the same as those for film holder 40, except for this feature of counterpulling tongue 176 while the dark envelope is being withdrawn.

Numerous variations, within the scope of the appended claims, will be apparent to those skilled in the art in light of the foregoing description and accompanying drawings. These variations are merely illustrative.

What is claimed is:

1. A pliable film holder for large format photographic film comprising:
 a relatively pliable, flat film retainer for removably holding a sheet of format film, said retainer having a back and a front, said front having an opening therein dimensioned to accept the sheet of large format film and to allow light to pass through the opening to expose the sheet of film when the film holder is used in a camera, said sheet of film being held fixed in place by the film retainer, said back of the film retainer being substantially opaque to prevent light coming from the direction of the back of the film retainer from exposing the film;

a relatively pliable, sheet-like slide member suitably dimensioned to completely cover the opening in the film retainer when disposed in a first position with respect to the film retainer and for uncovering at least a part of the opening to expose the sheet of film to incident light when disposed in a second position with respect to the film retainer;

said film retainer and the slide member having cooperating guide means for guiding the slide member as it is moved longitudinally with respect to the film retainer;

said film retainer including a sheet of relatively pliable material disposed between the back and front of the film retainer and fixed into position with respect thereto, said sheet of pliable material having an opening therein corresponding in position to the opening through the front of the film retainer to permit incident light through the front of the film retainer to pass through the opening in the sheet of pliable material;

said sheet of pliable material also having a slot therein spaced from the opening in the sheet of pliable material, said slot being dimensioned to allow the sheet of film to be inserted through the slot to a position behind the opening of the sheet of pliable material.

2. The pliable film holder as set forth in claim 1 wherein the sheet of pliable material and the back of the film retainer define a space suitably dimensioned to accept the sheet of film, the spacing between the sheet of pliable material and the back of the film retainer being comparable to the thickness of the sheet of film so that the sheet of pliable material retains the sheet of film in place against the back of the film retainer once the film has been inserted into the space between the sheet of pliable material and said back.

3. The pliable film holder as set forth in claim 1 wherein the perimeter of the sheet of pliable material together with the back of the film retainer form a pair of grooves extending longitudinally along the sides of the sheet of pliable material, the width of said sheet of pliable material being somewhat less than that of the back of the film retainer so that the grooves are spaced inwardly from the sides of the film retainer and are covered by the front of the film retainer.

4. The pliable film holder as set forth in claim 3 wherein the slide member includes a pair of longitudinally extending tongues along the sides of the slide member disposed to fit within the grooves between the sheet of pliable material and the back of the film retainer.

5. The pliable film holder as set forth in claim 3 wherein the grooves between the sheet of pliable material and the back of the film retainer face toward their respective edges of the film retainer.

6. The pliable film holder as set forth in claim 5 wherein the slide member includes a pair of longitudinally extending flaps along the sides of the slide, said flaps forming tongues disposed to fit within the grooves between the sheet of pliable material and the back of the film retainer, said flaps being folded inwardly from the sides of the slide member.

7. The pliable film holder as set forth in claim 1 wherein the front of the film retainer longitudinally along the sides of the opening in the front forms a set of longitudinally extending tracks for the slide member to ride upon as it is moved to cover and uncover the opening in the front of the film retainer.

8. A pliable film holder for large format photographic film comprising:

a relatively pliable, flat film retainer for removably holding a sheet of large format film, said retainer having a back and a front, said front having an opening therein dimensioned to accept the sheet of large format film and to allow light to pass through the opening to expose the sheet of film, when the film holder is used in a camera, said sheet of film being held fixed in place by the film retainer, said back of the film retainer being substantially opaque to prevent light coming from the direction of the back of the film retainer from exposing the film;

a relatively pliable, sheet-like slide member suitably dimensioned to completely cover the opening in the film retainer when disposed in a first position with respect to the film retainer and for uncovering at least a part of the opening to expose the sheet of film to incident light when disposed in a second position with respect to the film retainer;

said film retainer and slide member having cooperating guide means for guiding the slide member as it is moved longitudinally with respect to the film retainer;

the front of the film retainer longitudinally along the sides of the opening in the front forms a set of longitudinally extending tracks for the slide member to ride upon as it is moved to cover and uncover the opening in the front of the film retainer, said slide member having a pair of longitudinally extending grooves along the side thereof, said grooves facing their respective sides of the slide member and being disposed so that the grooves of the slide member ride upon the tracks formed by the front of the film retainer.

9. The pliable film holder as set forth in claim 8 wherein the slide member has a second pair of longitudinally extending grooves along its sides for mating with a corresponding structure in the film retainer to guide the slide member and further exclude light from the exterior of the film holder, said second pair of grooves being disposed parallel to the first set of grooves and closer to the back of the film retainer than the first set of grooves.

10. The pliable film holder as set forth in claim 8 wherein the front of the film retainer includes a pair of notches disposed at one end of the opening in said front and extending toward the respective sides of the front, said notches being sized to accept the slide member and allow the grooves of the slide member to be initially placed upon the tracks of the film retainer.

11. A pliable film older for large format photographic film comprising:

a relatively pliable, flat film retainer for removably holding a sheet of large format film, said retainer having a back and a front, said front having an opening therein dimensioned to accept the sheet of large format film and to allow light to pass through the opening to expose the sheet of film when the film holder is used in a camera, said sheet of film being held fixed in place by the film retainer, said back of the film retainer being substantially opaque to prevent light coming from the direction of the back of the film retainer from exposing the film;

a relatively pliable, sheet-like slilde member suitably dimensioned to completely cover the opening in the film retainer when disposed in a first position with respect to the film retainer and for uncovering at least part of the opening to expose the sheet of film to incident light when disposed in a second position with respect to the film retainer;

said film retainer and slide member having cooperating guide means for guiding the slide member as it is moved longitudinally with respect to the film retainer;

the front and back of the film retainer being of unified one piece construction along three edges of the film retainer, leaving the fourth edge open to allow the slide member to be inserted therein.

12. The pliable film holder as set forth in claim 11 wherein the distance between the front and the back of the film retainer is comparable to the thickness of the slide means, said slide means further including a transversely extending stop protruding up from the surface of the slide means which faces the front of the film retainer, said stop protruding upwardly enough so that it strikes the front of the film retainer at one edge of the opening when the slide means is pulled outwardly with respect to the opening when the film holder is in a camera.

13. The pliable film holder as set forth in claim 12 further including a rigid adapter suitably dimensioned to fit in a large format camera, said rigid adapter being much thicker than the film holder and including a slot in which the film holder may be removably inserted, said adapter also including means adjacent to the mouth of the slot for forcing the front of the film retainer toward the back of the film retainer to ensure that the protruding stop of the slide member engages the front of the film retainer as the slide member is partially withdrawn to reveal the film in the film holder.

14. The pliable film holder as set forth in claim 13 wherein the thickness of the film holder is equal to sum total thickness of the number of layers of pliable material used, and the thickness of the adapter is approximately the same as that of a prior art film holder.

15. A pliable film holder for large format photographic film comprising:

a relatively pliable, flat film retainer for removably holding a sheet of large format film, said retainer having a back and a front, said front having an opening therein dimensioned to accept the sheet of large format film and to allow light to paas through the opening, to expose the sheet of film when the film holder is used in a camera, said sheet of film being held fixed in place by the film retainer, said back of the film retainer being substantially opaque to prevent light coming from the direction of the back of the film retainer from exposing the film;

a relatively pliable, sheet-like slide member suitably dimensioned to completely cover the opening in the film retainer when disposed in a first position with respect to the film retainer, and for uncovering at least part of the opening to expose the sheet of film to incident light when disposed in a second position with respect to the film retainer;

said film retainer and slide member having cooperating guide means for guiding the slide member as it is moved longitudinally with respect to the film retainer;

the slide member including light baffles along all four sides of the slide member to prevent light from entering the film holder when the slide member completely covers the opening in the film retainer.

16. A pliable film holder for large format photographic film comprising:

a relatively pliable, flat film retainer for removably holding a sheet of large format film, said retainer having a back and a front, said front having an opening therein dimensioned to accept the sheet of large format film and to allow light to pass through the opening to expose the sheet of film when the film holder is used in a camera, said sheet of film being held fixed in place by the film retainer, said back of the film retainer being substantially opaque to prevent light coming from the direction of the back of the film retainer from exposing the film;

a relatively pliable, sheet-like slide member suitably dimensioned to completely cover the opening in the film retainer when disposed in a first position with respect to the film retainer and for uncovering at least part of the opening to expose the sheet of film to incident light when disposed in a second position with respect to the film retainer;

said film retainer and slide member having cooperating guide means for guiding the slide member as it is moved longitudinally with respect to the film retainer;

the slide member including a pocket into which a piece of paper may be inserted for film exposure record keeping.

17. A pliable film holder for large format photographic film comprising:

a relatively pliable, flat film retainer for removably holding a sheet of large format film, said retainer having a back and a front, said front having an opening therein dimensioned to accept the sheet of large format film and to allow light to pass through the opening to expose the sheet of film when the film holder is used in a camera, said sheet of film being held fixed in place by the film retainer, said back of the film retainer having substantial strength and flatness to maintain a sheet of film flat against the back of the film retainer, relatively pliable, substantially opaque slide means for completely covering the entire film retainer when disposed in a first position with respect to the film retainer so as to prevent light from entering through either front or back to expose film and for uncovering at least part of the film retainer to expose the sheet of film to incident light when disposed in a second position with respect to the film retainer, said slide means forming an envelope in which the film retainer is slidably disposed;

the front of the film retainer also having a slot therein spaced from the opening in said front, said slot being dimensioned to allow the sheet of film to be inserted through the slot to a position behind the opening of said front of the film retainer.

18. A pliable film holder for large format photographic film comprising:

a relatively pliable, flat film retainer for removably holding a sheet of large format film, said retainer having a back and front, said front having an opening therein dimensioned to accept the sheet of large format film and to allow light to pass through the opening to expose the sheet of film when the film holder is used in a camera, said sheet of film being held fixed in place by the film retainer, said back of the film retainer having substantial strength and flatness to maintain a sheet of film flat against the back of the film retainer;

relatively pliable, substantially opaque slide means for completely covering the entire film retainer when disposed in a first position with respect to the film retainer so as to prevent light from entering through either front or back to expose film and for uncovering at least part of the film retainer to expose the sheet of film to incident light when disposed in a second position with respect to the film retainer, said slide means forming an envelope in which the film retainer is slidably disposed;

a pair of flaps secured to the front and back of the film retainer respectively for overlaying both sides of the slide means when the slide means is disposed in the first position to prevent light from entering the interior of the slide means to expose the film.

19. A pliable film holder for large format photographic film comprising:

a relatively pliable, flat film retainer for removably holding a sheet of large format film, said retainer having a back and front, said front having an opening therein dimensioned to accept the sheet of large format film and to allow light to pass through the opening to expose the sheet of film when the film holder is used in a camera, said sheet of film being held fixed in place by the film retainer, said back of the film retainer having substantial strength and flatness to maintain a sheet of film flat against the back of the film retainer;

relatively pliable, substantially opaque slide means for completely covering the entire film retainer when disposed in a first position with respect to the film retainer so as to prevent light from entering through either front or back to expose film and for uncovering at least part of the film retainer to expose the sheet of film to incident light when disposed in a second position with respect to the film retainer, said slide means forming an envelope in which the film retainer is slidably disposed;

a rigid adaptor suitably dimensioned to fit in a large format camera, said rigid adaptor being much thicker than the film holder and including a slot in which the film holder may be removably inserted, said adaptor further having a small slit disposed at the end opposite the slot for the film holder insertion to failitate protrusion of the small portion of the film retainer out from the slit when the film holder is inserted all the way into the said adaptor, said adaptor also including a backing plate defining a back of an opened space in the adaptor for the sheet of film, and means for applying a vacuum from an external source to the film holder disposed against the backing plate to flatten the sheet of film against said plate.

20. The pliable film holder as set forth in claim 19 wherein the vacuum applying means includes a generally hollow chamber in the adapter on the side of the backing plate opposite the film holder and a plurality of orifices from the hollow chamber through the backing plate.

21. The pliable film holder as set forth in claim 19 wherein the small portion of the film holder is a tab extending outwardly from the body of the film retainer a distance sufficient to pass through the small slit of the adapter where the film retainer is fully seated in the adapter.

22. The invention of claim 21, and wherein means for retaining the tab of the film holder while the opaque slide means shifts between its first and second positions.

23. A pliable film holder for large format photographic film comprising:

a relatively pliable, flat film retainer for removably holding a sheet of large format film, said retainer having a back and a front, said front having an opening therein dimensioned to accept the sheet of large format film and to allow light to pass through the opening to expose the sheet of film when the film holder is used in a camera, said sheet of film being held fixed in place by the film retainer, said back of the film retainer being substantially opaque to prevent light coming form the direction of the back of the film retainer from exposing the film;

a relative pliable, sheet-like slide member suitably dimensioned to completely cover the opening in the film retainer when disposed in a first position with respect to the film retainer and for uncovering at least part of the opening to expose the sheet of film to incident light when disposed in a second position with respect to the film retainer;

said film retainer and slide member having cooperating guide means for guiding the slide member as it is moved longitudinally with respect to the film retainer, said film retainer forming a pair of grooves extending longitudinally along its sides, and said slide member including extending tongues along its side and disposed to fit within the film retainer grooves to facilitate the relative movement of the slide member with respect to the film retainer.

* * * * *

UNITED STATES PATENT AND TRADEMARK OFFICE
CERTIFICATE OF CORRECTION

PATENT NO. : 4,804,989

DATED : February 14, 1989

INVENTOR(S) : Shin-ichi Kumanomido

It is certified that error appears in the above—identified patent and that said Letters Patent is hereby corrected as shown below:

Claim 11, column 12, line 53, change "older" to ---holder---.

Claim 15, column 13, line 45, change "paas" to ---pass---.

Claim 19, column 15, line 43, change "failitate to ---facilitate---.

Claim 23, column 16, line 32, change "relative" to ---relatively---.

Claim 23, column 16, line 45, change "side" to ---sides---.

Signed and Sealed this

Twelfth Day of September, 1989

Attest:

DONALD J. QUIGG

Attesting Officer

Commissioner of Patents and Trademarks